(12) United States Patent
Yi et al.

(10) Patent No.: US 10,090,615 B1
(45) Date of Patent: Oct. 2, 2018

(54) PANEL MOUNT ELECTRICAL CONNECTOR WITH MOISTURE RESISTANT MATING FACE

(71) Applicant: TE CONNECTIVITY CORPORATION, Berwyn, PA (US)

(72) Inventors: Chong Hun Yi, Mechanicsburg, PA (US); Tom Morris, Gray, TN (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/712,387

(22) Filed: Sep. 22, 2017

(51) Int. Cl.
*H02B 1/01* (2006.01)
*H01R 13/52* (2006.01)
*H01R 4/28* (2006.01)
*H01R 13/627* (2006.01)

(52) U.S. Cl.
CPC ........... *H01R 13/5219* (2013.01); *H01R 4/28* (2013.01); *H01R 13/6271* (2013.01)

(58) Field of Classification Search
CPC ... H01R 13/6271; H01R 4/28; H01R 13/5219
USPC .............. 439/271, 548, 556, 559, 550, 562
See application file for complete search history.

(56) References Cited

U.S. PATENT DOCUMENTS

| | | | |
|---|---|---|---|
| 4,230,985 A * | 10/1980 | Matrone | G01R 1/07314 324/750.25 |
| 5,249,982 A * | 10/1993 | Funck | H01R 13/743 439/556 |
| 5,618,204 A * | 4/1997 | Nix | H01R 13/5202 439/271 |
| 5,895,290 A * | 4/1999 | Self, Jr. | H01R 13/5208 439/556 |
| 6,139,351 A * | 10/2000 | Schaefer | B60L 3/0069 439/372 |
| 6,159,041 A * | 12/2000 | Davis | H01R 13/5213 439/559 |
| 6,768,860 B2 * | 7/2004 | Liberty | G02B 6/4453 385/135 |
| 7,090,533 B1 * | 8/2006 | Houck | H01R 13/743 439/546 |
| 7,462,067 B1 * | 12/2008 | Whiteman, Jr. | H01R 13/743 439/562 |
| 9,819,107 B2 * | 11/2017 | Logan, Jr. | H01R 12/91 |
| 2002/0025718 A1 * | 2/2002 | Cabalka | H01R 13/73 439/562 |

(Continued)

*Primary Examiner* — Abdullah Riyami
*Assistant Examiner* — Nelson R Burgos-Guntin

(57) ABSTRACT

A dielectric housing with a forward mating portion, a flange and a rear portion. The forward mating portion is receivable in a cutout in a mounting panel. The flange extends from the housing and is dimensioned larger than the cutout. The rear portion has a rear face with terminal-receiving cavities extending inwardly through the rear face. A top surface of the forward mating portion extends from the flange at an obtuse angle, the top surface is essentially perpendicular to a forward mating face of the forward mating portion of the housing. The terminal-receiving cavities extend from the rear face to the forward mating face, with the longitudinal axis of the terminal-receiving receiving cavities extending in a straight line. The forward mating face of the housing is angled relative to the flange and the mounting panel to prevent condensation from occurring on the forward mating face.

20 Claims, 6 Drawing Sheets

(56) References Cited

U.S. PATENT DOCUMENTS

| | | | |
|---|---|---|---|
| 2010/0190375 A1* | 7/2010 | Rohde | H01R 13/5202 |
| | | | 439/549 |
| 2014/0273577 A1* | 9/2014 | Puluc | H01R 13/62 |
| | | | 439/271 |
| 2015/0147911 A1* | 5/2015 | Logan, Jr. | H01R 12/91 |
| | | | 439/577 |
| 2016/0268721 A1* | 9/2016 | Harmon | H01R 13/5202 |
| 2017/0214173 A1* | 7/2017 | Blair | H01R 13/5213 |
| 2018/0054014 A1* | 2/2018 | Logan, Jr. | H01R 12/91 |

\* cited by examiner

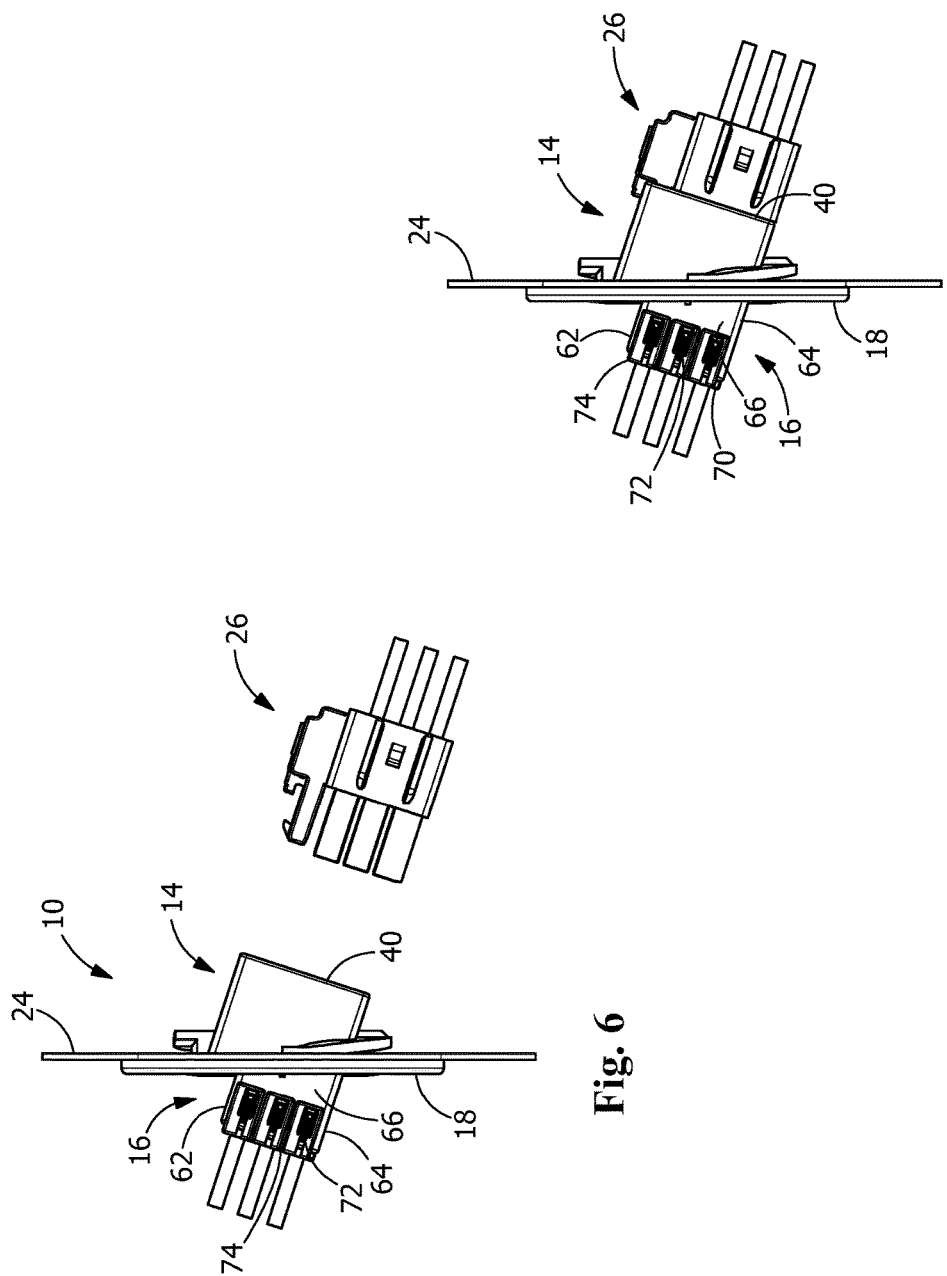

PANEL MOUNT ELECTRICAL CONNECTOR WITH MOISTURE RESISTANT MATING FACE

FIELD OF THE INVENTION

The invention is directed to a panel mount electrical connector which engages with the panel. More particularly, the invention is directed to a panel mount connector which has a mating surface which resists the ingress of moisture therethrough.

BACKGROUND OF THE INVENTION

Panel mount connectors extend through a panel and provide an electrical interface on either side of the panel. The panel separates different spaces or environments. This requires that the panel mount connector be properly configured on either side of the connector to properly perform in the environment in which is it positioned. For example, a refrigerator often has an electrical connector mounted in a cutout in a panel to provide an interface between electrical devices on opposite sides of the panel. When the panel separates a refrigerated space from a non-refrigerated space, it is necessary to provide a good seal between the electrical connector and the panel in order to prevent exchange of foam and water between the spaces. Presently, such panel mount electrical connectors have seal members at a terminal receiving face and a mating face to prevent the ingress of moisture which is harmful to the terminals. However, providing sealing members at both interfaces is costly and requires significant mating force when a mating connector is mated to the panel mount connector.

It would, therefore, be beneficial to provide a panel mount connector which does not require a sealing member at the mating face while still preventing condensation or moisture from forming or occurring on the mating face.

SUMMARY OF THE INVENTION

An object is to provide a panel mount connector which prevents condensation or moisture from forming or occurring on a forward mating face prior to mating with a mating connector.

An embodiment is directed to a panel mount electrical connector which includes a dielectric housing and a flange seal. The dielectric housing has a forward mating portion which is receivable in a cutout in a mounting panel. A flange extends from the housing and is dimensioned to be larger than the cutout. Mounting projections are opposed to the flange for capturing the mounting panel between the mounting projections and the flange. A rear portion has a rear face with terminal-receiving cavities extending inwardly through the rear face. The flange extends from the housing at an angle relative to a forward mating face of the forward mating portion of the housing, the angle being between 10 degrees and 80 degrees. The terminal-receiving cavities extend from the rear face to the forward mating face, with the longitudinal axis of the terminal-receiving receiving cavities extending in a straight line. The flange seal is configured to seal between the mounting panel and the flange when the electrical connector is mounted in the mounting panel. The forward mating face of the housing is angled relative to the flange and the mounting panel to prevent condensation from occurring on the forward mating face.

An embodiment is directed to a panel mount electrical connector having a dielectric housing with a forward mating portion, a flange and a rear portion. The forward mating portion is receivable in a cutout in a mounting panel. The flange extends from the housing and is dimensioned larger than the cutout. Mounting projections are provided opposed to the flange for capturing the mounting panel between the mounting projections and the flange. The rear portion has a rear face with terminal-receiving cavities extending inwardly through the rear face. A top surface of the forward mating portion extends from the flange at an obtuse angle. The top surface is essentially perpendicular to a forward mating face of the forward mating portion of the housing. The terminal-receiving cavities extend from the rear face to the forward mating face, with the longitudinal axis of the terminal-receiving receiving cavities extending in a straight line. The forward mating face of the housing is angled relative to the flange and the mounting panel to prevent condensation from occurring on the forward mating face.

An embodiment is directed to a panel mount electrical connector having a dielectric housing with a forward mating portion which is receivable in a cutout in a mounting panel, a flange extending from the housing and dimensioned larger than the cutout and a rear portion having a rear face with terminal-receiving cavities extending inwardly through the rear face. A top surface of the forward mating portion extends from the flange at an obtuse angle. The top surface of the forward mating portion is essentially perpendicular to a forward mating face of the forward mating portion of the housing. A top surface of the rear portion extends from the flange at an acute angle, the top surface of the rear portion is essentially perpendicular to the rear face of the rear portion of the housing. The forward mating face is essentially parallel to the rear. The forward mating face of the housing is angled relative to the flange and the mounting panel to prevent condensation from occurring on the forward mating face.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 6 is a side view of the panel mount connector of FIG. 1 and a mating connector prior to mating with the panel mount connector.

FIG. 7 is a side view of the panel mount connector mated to the mating connector.

DETAILED DESCRIPTION OF THE INVENTION

Figure 1:
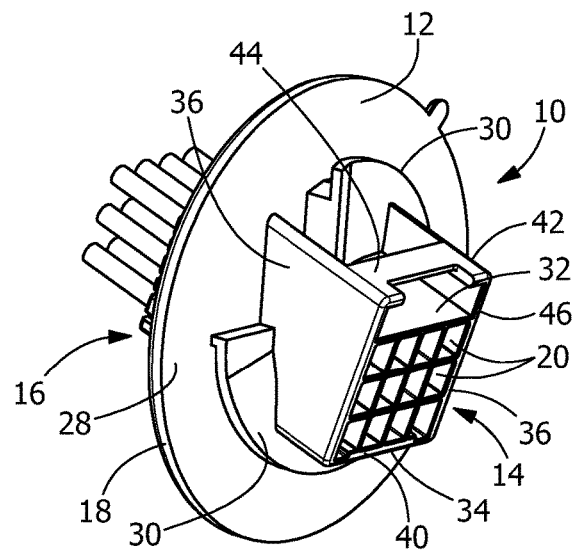
FIG. 1 is a perspective view of an illustrative embodiment of a panel mount connector of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

As best shown in FIG. 1, a panel mount electrical connector according to the invention comprises a dielectric housing 10 and a flange seal 12. The housing 10 includes a forward portion 14, a rearward portion 16 and a flange 18 which extends laterally around the housing 10 between the forward and rearward portions 14, 16. Terminal-receiving cavities 20 extend through the forward portion 14 and the rearward portion 16 of the housing 10.

Figure 8:
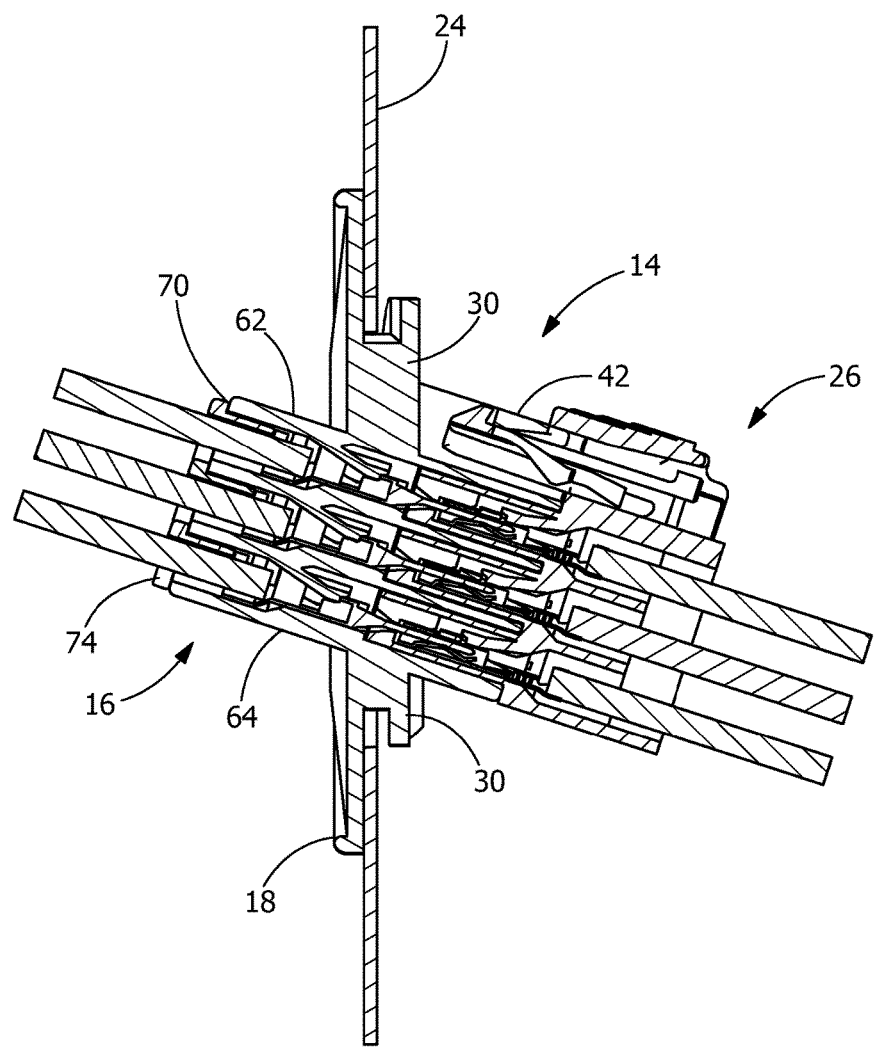
FIG. 8 is a cross-sectional view of the mated panel mount connector and mating connector of FIG. 7.

As best shown in FIGS. 2 through 5, the forward portion 14 of the housing 10 is insertable through a cutout 22 in a mounting panel 24 which may be, for example, a wall of an appliance or other piece of equipment. The forward portion 14 of the housing 10 is configured for mating with a complementary mating electrical connector 26 (FIGS. 6 through 8). The flange 18 of the housing 10 is dimensioned larger than the cutout 22 so that a front face 28 of the flange 18 will engage the mounting panel 24 around the cutout 22. The forward portion 14 of the housing 10 has mounting projections 30 which are arranged in opposition to the flange 18 to capture the mounting panel 24 therebetween and thereby hold the connector in the cutout 22 of the mounting panel 24.

Figure 2:
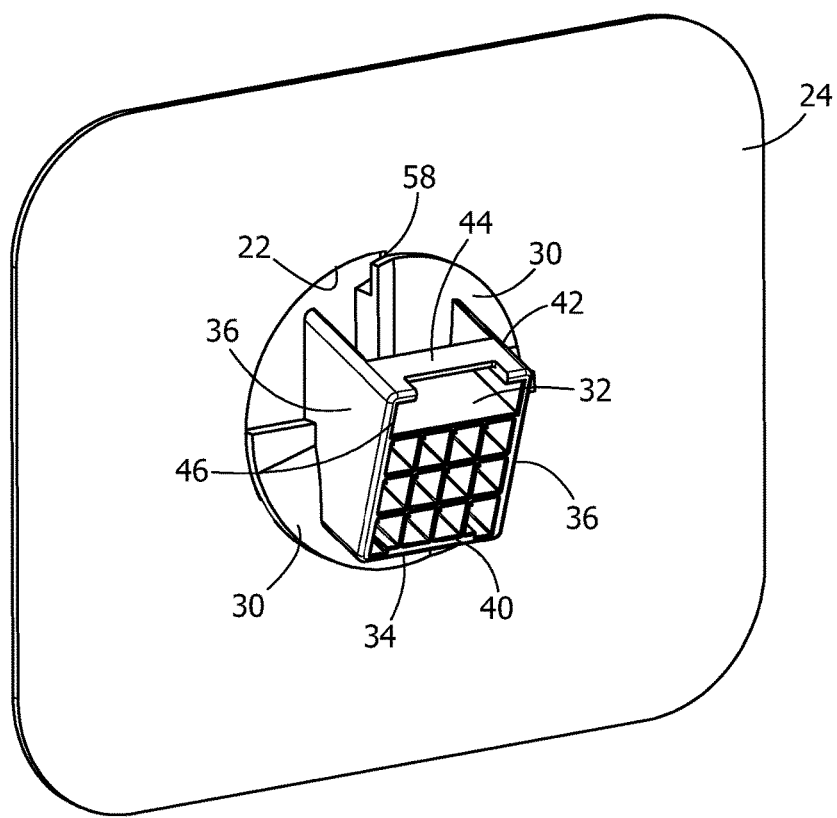
FIG. 2 is a front perspective view of the panel mount connector of FIG. 1 mounted to a panel.

As best shown in FIGS. 1 and 2, the forward portion 14 of the housing 10 has a top surface or wall 32, an oppositely facing bottom surface or wall 34 and side surfaces or walls 36 which extend between the top wall 32 and the bottom wall 34. A forward mating face 40 extends between top wall 32, bottom wall 34 and side walls 36. The terminal-receiving cavities 20 extend through the mating face 40. A latching area 42 extends from the top wall 32 proximate the mating face 40. In the illustrative embodiment shown, the latching area 42 includes a latching plate 44 which is spaced from the top wall 32 and which extends between side wall extensions 46. However, other configurations of the latching area may be used. The latching area 42 is configured to cooperate with the mating connector 26 which cooperates with the forward mating face 40.

Figure 5:
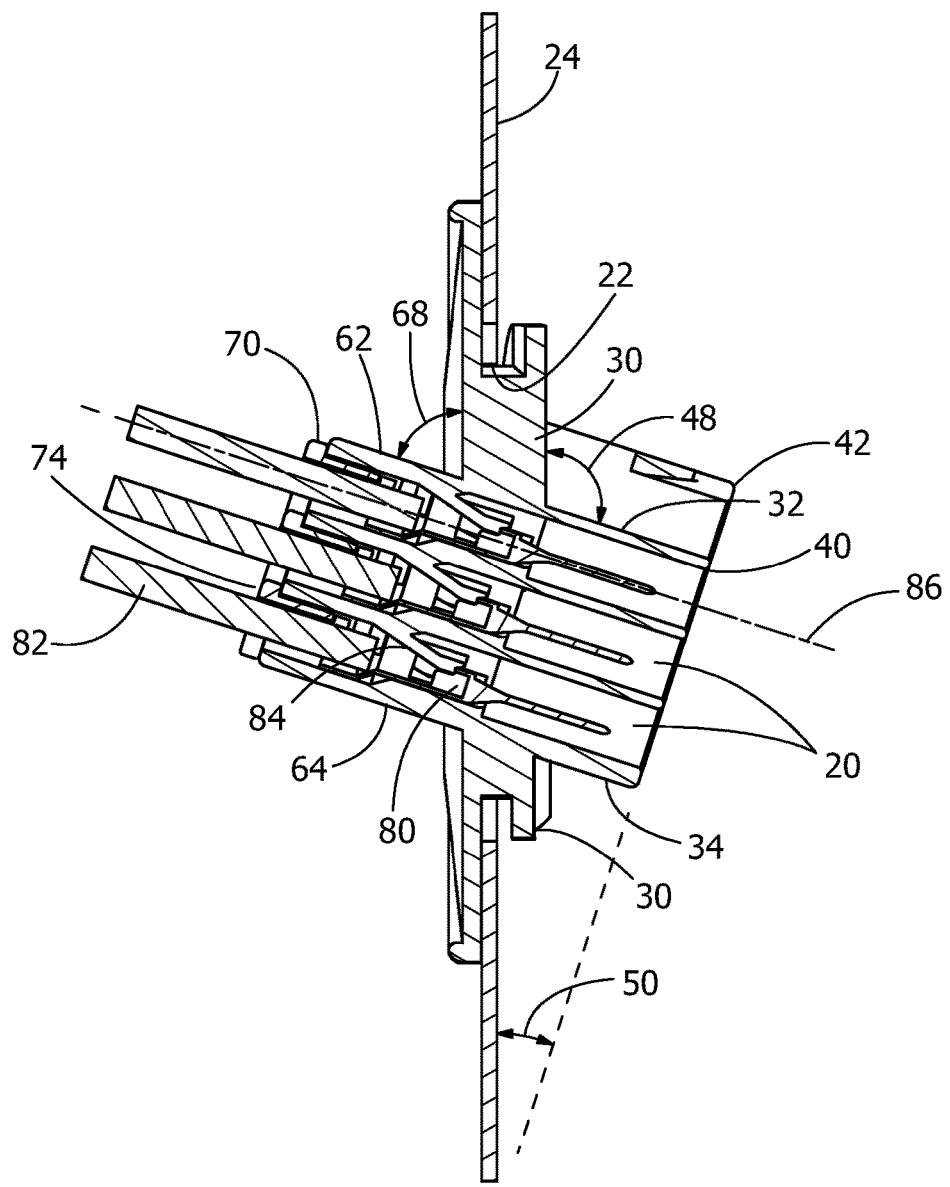
FIG. 5 is a cross-sectional view of the panel mount connector of FIG. 1 mounted to a panel.

Referring to FIG. 5, the top surface or wall 32 of the forward mating portion 14 extends from the flange 18 at an obtuse angle 48. The obtuse angle 48 may be, for example, but not limited to, between 100 degrees and 170 degrees, 105 degrees and 165 degrees, 110 degrees and 160 degrees, 120 degrees and 150 degrees, or between 155 degrees and 165 degrees. In addition, the top surface or wall 32 is essentially perpendicular to the forward mating face 40. Consequently, the forward mating face 40 is angled at an acute angle 50 relative to the flange 18. The angle 50 may be, for example, but not limited to, between 10 degrees and 80 degrees, 15 degrees and 75 degrees, 20 degrees and 70 degrees, 30 degrees and 60 degrees, or between 15 degrees and 25 degrees. The angling of the top surface or wall 32 and the forward mating face 40 of the forward mating portion 14 of the housing 10 allows moisture or condensation to flow down the top surface or wall 32 and be removed without contacting the forward mating face 40 of the forward mating portion 14. The angling of the top surface or wall 32 and the forward mating face 40 of the forward mating portion 14 of the housing 10 also prevents condensation or moisture from forming or occurring on the forward mating face 14 prior to mating with the mating connector 26.

Figure 4:
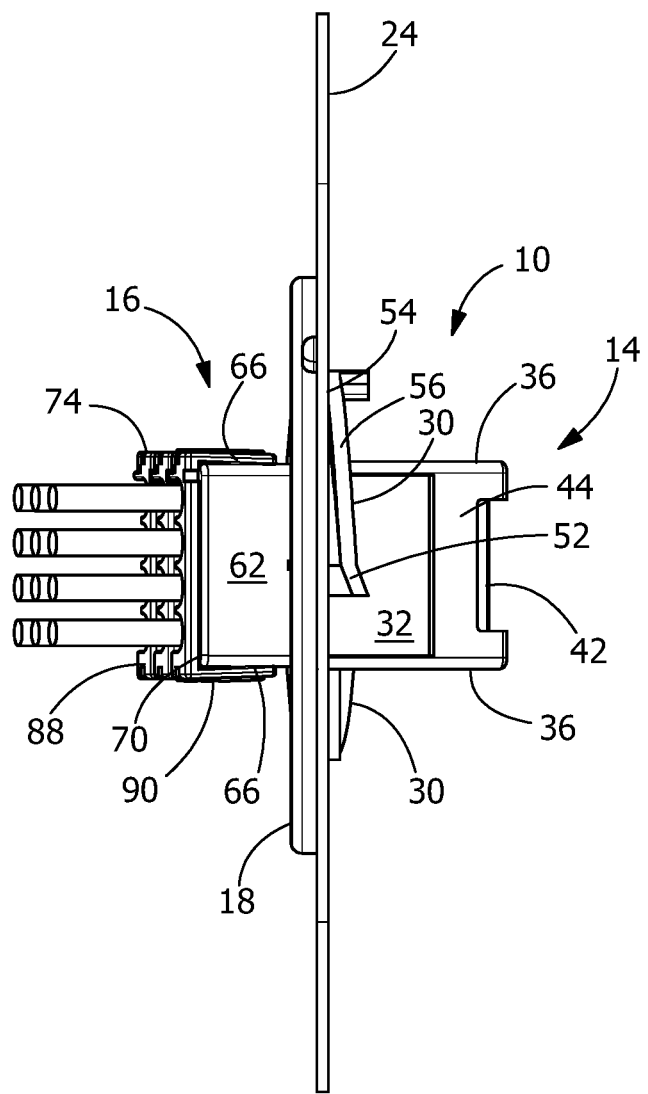
FIG. 4 is a top view of the panel mount connector of FIG. 1 mounted to a panel.

As best shown in FIG. 4, the mounting projections 30 are provided on the forward mating portion 14 and extend from one or more of the top surface or wall 32, the bottom surface or wall 34 and or the side surfaces or walls 36. The mounting projections 30 have a first portion 52 that is spaced from the flange 18 a greater distance than a second portion 54, with an intermediate portion 56 being sloped or tapered from the first portion 52 to the second portion 54. As the panel mount connector is inserted and rotated or twisted in the cutout 22 in the mounting panel 24, the second portion 54 engages mating members 58 which extend into the cutout 22 of the panel 24. As the panel mount connector is rotated, the engagement of the second portions 54 and the mating member 58 cause the flange 18 to be pulled or moved toward the panel 24. In so doing, the mating members 58 are tightly secured between the second portions 54 and the flange 18, thereby securing the housing 10 of the panel mount electrical connector to the mounting panel 24. In alternate embodiments, the panel mount connector may mounted using snap-in projections or other known mounting methods and members.

Figure 3:
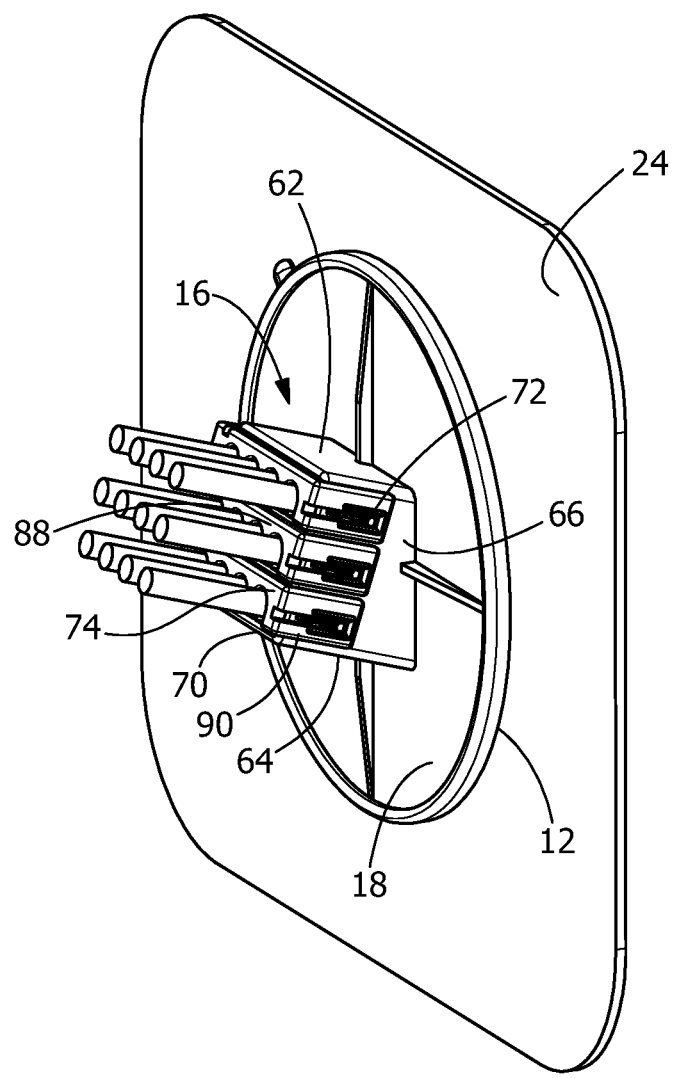
FIG. 3 is a rear, side perspective view of the panel mount connector of FIG. 1 mounted to a panel.

As best shown in FIGS. 3 and 4, the rearward portion 16 of the housing 10 has a top surface or wall 62, an oppositely facing bottom surface or wall 64, and side surfaces or walls 66 which extend between the top wall 62 and the bottom wall 64. A rear terminal-receiving face 70 extends between top wall 62, bottom wall 64 and side walls 66. The rear terminal-receiving face 70 of the rear portion 16 is essentially parallel to the forward mating face 40 of the forward mating portion 14. The terminal-receiving cavities 20 extend through the rear terminal-receiving face 70. Terminal position assurance (TPA) latching members 72 extend from the side walls 66. The TPA latching members 72 are configured to cooperate with terminal position assurance members 74.

The top surface or wall 62 of the rear portion 16 extends from the flange 18 at an acute angle 68 and is essentially perpendicular to the rear terminal-receiving face 70 (FIG. 5) of the rear portion 16 of the housing 10. The acute angle 68 may be, for example, but not limited to, between 10 degrees and 80 degrees, 15 degrees and 75 degrees, 20 degrees and 70 degrees, 30 degrees and 60 degrees, or between 15 degrees and 25 degrees.

The flange seal 12 is provided proximate the flange 18 and covers at least a portion of the front face of the flange 18. The flange seal 12 is preferably formed as a separate sheath which is pliable so that it can be installed on and removed from the housing 10. However, the flange seal 12 may be adhered to the housing 10 by overmolding. The flange seal 12 is preferably made from an elastomeric material such as silicon rubber or foam. The flange seal 12 is configured to seal between the flange 18 and the mounting panel 24 when the electrical connector is installed through the cutout 22 of the mounting panel 24.

As best shown in FIG. 5, terminals 80, which are physically and electrically connected to conductors 82, are inserted into the terminal-receiving cavities 20 of the housing 10 and are retained therein by resilient latching arms 84. The particular configuration of the terminals 80 and the resilient latching arms 84 are shown for illustrative purposes, but may vary. The longitudinal axis 86 of each of the terminal-receiving cavities 20 extends in a straight line through the entire terminal-receiving cavities 20 and the housing 10. There are no bends provided in the longitudinal axis 86 of the terminal-receiving cavities 20. This allows the housing 10 to be manufactured using known tooling.

One or more terminal position assurance members 74 are positioned on the rearward portion. Each terminal position assurance members 74 is a separate molded member with a terminal engaging portion 88 and two resilient latching arms 90 which extend from either side of the terminal engaging portion 88. When moved into position on the rearward end 16 of the housing 10, the terminal engaging portions 88 span the rear terminal-receiving face 70 and are dimensioned to engage ends of the terminals 80. The resilient latching arms 90 are configured to engage and cooperate with the TPA latching members 72 of the rearward portion 16 of the housing. The terminal position assurance members 74 are positioned over the rear terminal-receiving face 70 after the terminals 80 have been inserted into the terminal-receiving cavities 20. If any terminal 80 is not fully seated into its respective terminal-receiving cavity 20, the unseated terminal 80 will engage the terminal engaging portion 88 of the terminal position assurance member 74, preventing the resilient latching arms 90 of the terminal position assurance member 74 from engaging or latching to the TPA latching members 72 of the rearward portion 16 of the housing 10, thereby alerting the assembler to check for one or more unseated terminals.

A sealing member (not shown) may be provided proximate the rear terminal-receiving face 70 of the rear portion 16. The sealing member can be made of any material which prevents contaminants from entering the connector through gaps where conductors 82 enter the housing 10 of the connector. For example, the sealing member may be made from tape or elastomeric material such as silicon rubber. The sealing member provides protection to the terminals 80 from foam or other material which may be introduced into a compartment in which the rear portion 16 of the housing 10 is positioned. Alternatively, tape may be applied to the rear terminal-receiving face 70 of the rear portion 16 prevents contaminants from entering the connector through gaps where conductors 82 enter the housing 10 of the connector.

The panel mount connector of the present invention provides a low cost, easily manufactural connector which can be used in various environments. The configuration of the forward mating portion 14 of the housing 10, and in particular, the top surface or wall 32 and the forward mating face 40 prevents condensation or moisture from forming or occurring on the forward mating face 14 prior to mating with the mating connector 26. Consequently, the present connector does not require a compression seal to be provided on the mating face, thereby reducing the cost of the connector. In addition, the elimination of the seal on the mating face allows for a lower mating force to be required when mating the electrical connector 26 to the housing 10, thereby providing a more economically friendly connector system.

Although the mating face 40 is angled relative to the flange 18, the housing 10 can be manufactured using known manufacturing techniques and machinery. As the longitudinal axis 86 of each of the terminal-receiving cavities 20 extends in a straight line through the entire terminal-receiving cavities 20 and the housing 10, known straight pull molds and machinery can be used.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A panel mount electrical connector comprising:
    a dielectric housing having a forward mating portion which is receivable in a cutout in a mounting panel, a flange extending from the housing and dimensioned larger than the cutout, mounting projections opposed to the flange for capturing the mounting panel therebetween and a rear portion having a rear face with terminal-receiving cavities extending inwardly through the rear face;
    the flange extending from the housing at an acute angle relative to a forward mating face of the forward mating portion of the housing;
    the terminal-receiving cavities extending from the rear face to the forward mating face, longitudinal axis of the terminal-receiving cavities extending in a straight line;
    a flange seal configured to seal between the mounting panel and the flange when the electrical connector is mounted in the mounting panel;
    wherein the forward mating face of the housing is angled relative to the flange and the mounting panel to prevent condensation from occurring on the forward mating face.

2. The panel mount electrical connector of claim 1, wherein the forward mating face of the forward mating portion of the housing is parallel to the rear face of the rear portion of the housing.

3. The panel mount electrical connector of claim 1, wherein the angle between the flange and forward mating face of the forward mating portion of the housing is between 15 degrees and 25 degrees.

4. The panel mount electrical connector of claim 1, wherein the forward mating portion has a latching area proximate the forward mating face, the latching area configured to cooperate with a mating connector which cooperates with the forward mating face.

5. The panel mount electrical connector of claim 1, wherein the mating projections have a first portion, an intermediate portion and a second portion, the first portion being spaced from the flange a greater distance than the second portion, the intermediate portion being tapered from the first portion to the second portion, wherein as the panel mount connector is inserted and rotated in the cutout in the mounting panel, the second portion engages mating members of the panel to secure the panel mount electrical connector to the mounting panel.

6. The panel mount electrical connector of claim 1, wherein a top surface of the forward mating portion extends from the flange at an obtuse angle, the top surface is essentially perpendicular to the forward mating face.

7. The panel mount electrical connector of claim 1, wherein a terminal position assurance member is provided on the rear portion.

8. The panel mount electrical connector of claim 1, wherein the rear surface of the rear portion of the housing is sealed.

9. A panel mount electrical connector comprising:
  a dielectric housing having a forward mating portion which is receivable in a cutout in a mounting panel, a flange extending from the housing and dimensioned larger than the cutout, mounting projections opposed to the flange for capturing the mounting panel therebetween, and a rear portion having a rear face with terminal-receiving cavities extending inwardly through the rear face;
  a top surface of the forward mating portion extends from the flange at an obtuse angle, the top surface is essentially perpendicular to a forward mating face of the forward mating portion of the housing;
  the terminal-receiving cavities extending from the rear face to the forward mating face, longitudinal axis of the terminal-receiving cavities extending in a straight line;
  wherein the forward mating face of the housing is angled relative to the flange and the mounting panel to prevent condensation from occurring on the forward mating face.

10. The panel mount electrical connector of claim 9, wherein the obtuse angle between top surface of the forward mating portion and the flange is between 105 degrees and 165 degrees.

11. The panel mount electrical connector of claim 10, wherein the forward mating face of the forward mating portion of the housing is parallel to the rear face of the rear portion of the housing.

12. The panel mount electrical connector of claim 11, wherein the forward mating portion has a latching area proximate the forward mating face, the latching area configured to cooperate with a mating connector which cooperates with the forward mating face.

13. The panel mount electrical connector of claim 12, wherein the housing has mounting projections opposed to the flange for capturing the mounting panel.

14. The panel mount electrical connector of claim 13, wherein the mating projections have a first portion, an intermediate portion and a second portion, the first portion being spaced from the flange a greater distance than the second portion, the intermediate portion being tapered from the first portion to the second portion, wherein as the panel mount connector is inserted and rotated in the cutout in the mounting panel, the second portion engages mating members of the panel to secure the panel mount electrical connector to the mounting panel.

15. The panel mount electrical connector of claim 11, wherein a terminal position assurance member is provided on the rear portion.

16. The panel mount electrical connector of claim 15, wherein the rear surface of the rear portion of the housing is sealed.

17. A panel mount electrical connector comprising:
  a dielectric housing having a forward mating portion which is receivable in a cutout in a mounting panel, a flange extending from the housing and dimensioned larger than the cutout, and a rear portion having a rear face with terminal-receiving cavities extending inwardly through the rear face;
  a top surface of the forward mating portion extending from the flange at an obtuse angle, the top surface of the forward mating portion is essentially perpendicular to a forward mating face of the forward mating portion of the housing;
  a top surface of the rear portion extending from the flange at an acute angle, the top surface of the rear portion is essentially perpendicular to the rear face of the rear portion of the housing;
  the forward mating face being essentially parallel to the rear;
  wherein the forward mating face of the housing is angled relative to the flange and the mounting panel to prevent condensation from occurring on the forward mating face.

18. The panel mount electrical connector of claim 17, wherein the obtuse angle between top surface of the forward mating portion and the flange is between 105 degrees and 165 degrees.

19. The panel mount electrical connector of claim 17, wherein the forward mating portion has a latching area proximate the forward mating face, the latching area configured to cooperate with a mating connector which cooperates with the forward mating face.

20. The panel mount electrical connector of claim 17, wherein the housing has mounting projections opposed to the flange for capturing the mounting panel, the mating projections have a first portion, an intermediate portion and a second portion, the first portion being spaced from the flange a greater distance than the second portion, the intermediate portion being tapered from the first portion to the second portion, wherein as the panel mount connector is inserted and rotated in the cutout in the mounting panel, the second portion engages mating members of the panel to secure the panel mount electrical connector to the mounting panel.

* * * * *